(12) United States Patent
Hayama (10) Patent No.: US 10,101,529 B2
(45) Date of Patent: Oct. 16, 2018

(54) PREPARATION AND USAGE OF OPTICAL WAVEGUIDES (71) Applicant: EMPIRE TECHNOLOGY DEVELOPMENT LLC, Wilmington, DE (US)

(72) Inventor: Hidekazu Hayama, Osaka (JP)

(73) Assignee: Empire Technology Development LLC, Wilmington, DE (US)

( * ) Notice: Subject to any disclaimer, the term of this patent is extended or adjusted under 35 U.S.C. 154(b) by 107 days.

(21) Appl. No.: 15/037,789

(22) PCT Filed: Dec. 11, 2013

(86) PCT No.: PCT/US2013/074348
§ 371 (c)(1),
(2) Date: May 19, 2016

(87) PCT Pub. No.: WO2015/088510
PCT Pub. Date: Jun. 18, 2015

(65) Prior Publication Data
US 2016/0299290 A1 Oct. 13, 2016

(51) Int. Cl.
G02B 6/10 (2006.01)
G02B 6/125 (2006.01)
(Continued)

(52) U.S. Cl.
CPC .......... *G02B 6/125* (2013.01); *G02B 6/1221* (2013.01); *G02B 6/4206* (2013.01); *G02B 6/43* (2013.01); *G02B 6/138* (2013.01)

(58) Field of Classification Search
CPC .... G02B 6/125; G02B 6/1221; G02B 6/4206; G02B 6/43; G02B 6/138
(Continued)

(56) References Cited

U.S. PATENT DOCUMENTS 5,495,541 A * 2/1996 Murray ................. A61B 18/24
385/117
6,002,823 A * 12/1999 Chandross ............ G02B 6/125
385/129
(Continued)

FOREIGN PATENT DOCUMENTS

CN 101268022 A 9/2008
CN 101535859 A 9/2009
(Continued)

OTHER PUBLICATIONS

International Search Report and Written Opinion for International Application No. PCT/US2013/074348, dated Jun. 11, 2014.
(Continued)

*Primary Examiner* — Thomas A Hollweg
*Assistant Examiner* — Guy Anderson (57) ABSTRACT A mirrorless optical waveguide can include a cladding and a core. The core can include an elongate section parallel to a surface plane. The core can further include two curved end sections that curve toward a surface plane. The surface plane can be parallel to a substrate. The cladding can have nanoparticles made of acrylic and/or urethane. The core can have similar nanoparticles of acrylic and/or urethane as well as nanoparticles with a high refractive index such as zirconia. The mirrorless optical waveguide can be formed by ink-jet printing.

17 Claims, 11 Drawing Sheets (51) Int. Cl.
*G02B 6/43* (2006.01)
*G02B 6/122* (2006.01)
*G02B 6/42* (2006.01)
*G02B 6/138* (2006.01)

(58) Field of Classification Search
USPC .................................................. 385/129–132
See application file for complete search history.

(56) References Cited

U.S. PATENT DOCUMENTS

| | | | |
|---|---|---|---|
| 7,039,075 B2 | 5/2006 | Thornton | |
| 7,095,928 B2 | 8/2006 | Blauvelt et al. | |
| 7,471,856 B2* | 12/2008 | Degroot, Jr. | G02B 6/138 |
| | | | 385/129 |
| 7,972,875 B2* | 7/2011 | Rogers | H01L 21/00 |
| | | | 257/E21.206 |
| 8,197,147 B2* | 6/2012 | Lee | G02B 6/4204 |
| | | | 372/50.23 |
| 9,195,005 B2* | 11/2015 | Subbaraman | G02B 6/138 |
| 2004/0067033 A1* | 4/2004 | Aylward | G02B 6/02038 |
| | | | 385/124 |
| 2004/0114903 A1* | 6/2004 | Yamaguchi | G02B 6/02 |
| | | | 385/141 |
| 2004/0218849 A1 | 11/2004 | Blauvelt et al. | |
| 2008/0285930 A1 | 11/2008 | Gasca et al. | |
| 2010/0014806 A1* | 1/2010 | Lee | G02B 6/4204 |
| | | | 385/15 |
| 2011/0158595 A1 | 6/2011 | Burov et al. | |
| 2012/0027369 A1* | 2/2012 | Yoshida | G02B 6/02038 |
| | | | 385/123 |
| 2012/0114291 A1* | 5/2012 | Yoshida | C08F 20/14 |
| | | | 385/123 |
| 2012/0269327 A1 | 10/2012 | Okamoto et al. | |
| 2013/0005606 A1* | 1/2013 | Chakravarty | G01N 21/253 |
| | | | 506/9 |
| 2014/0355930 A1* | 12/2014 | Jahani | G02B 27/0176 |
| | | | 385/14 |
| 2015/0023643 A1* | 1/2015 | Chartoff | C08K 3/30 |
| | | | 385/124 |
| 2015/0093515 A1* | 4/2015 | Subbaraman | G02B 6/138 |
| | | | 427/492 |

FOREIGN PATENT DOCUMENTS

| | | |
|---|---|---|
| CN | 101933200 A | 12/2010 |
| CN | 201994393 U | 9/2011 |
| CN | 203191577 U | 9/2013 |

OTHER PUBLICATIONS

Selviah, D.R., et al., "Integrated Optical and Electronic Interconnect Printed Circuit Board Manufacturing," Journal of the Institute of Circuit Technology, vol. 1, No. 3, pp. 9-12 (Jun. 2008).

Wang, K., et al., "Optical Waveguide Modelling, Measurement and Design for Optical Printed Circuit Board," IEEE Workshop on Interconnections within High Speed Digital Systems, p. 1 (May 18-21, 2008).

Zakariyah, S.S., "Laser Ablation for Polymer Waveguide Fabrication," in Micromachining Techniques for Fabrication of Micro and Nano Structures, Chapter 6, Eds., Kahrizi, M., pp. 109-130 (Feb. 3, 2012).

* cited by examiner

PREPARATION AND USAGE OF OPTICAL WAVEGUIDES

CROSS-REFERENCE TO RELATED APPLICATION

The present Application is a U.S. National Stage filing under 35 U.S.C. § 371 of International Patent Application No. PCT/US2013/074348, filed on Dec. 11, 2013, and entitled "PREPARATION AND USAGE OF OPTICAL WAVEGUIDES", the entire disclosure of which is incorporated herein by reference.

BACKGROUND

An optical waveguide is a structure that can be used to guide electromagnetic waves (for example, light) in optoelectronic circuitry. Mirrors may be used to bring light into and out of the optical waveguide. However, reflection at the mirror can result in optic loss. In addition, mirrors can add to the cost and time of the manufacturing process.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

In some embodiments, a mirrorless optical waveguide can comprise a core structure comprising a first end portion, a second end portion, and an elongate section therebetween, wherein the elongate section is substantially parallel to a surface plane, and wherein the first end portion and second end portion are curved and extend from the elongate section to the surface plane; and a cladding structure at least partially surrounding the core structure, wherein a refractive index of the core structure is higher than a refractive index of the cladding structure.

In some embodiments, a method of making a mirrorless optical waveguide can comprise sequentially depositing a plurality of layers on a substrate, each layer comprising a first ink that forms a core structure portion, and a second ink that forms a cladding structure portion; wherein the core structure portion in one layer is configured to be offset from the core structure portion in an adjacent layer, such that when the plurality of two dimensional layers are deposited, the first ink portions form a three dimensional core structure having curved end portions that extend toward a surface of the optical waveguide, and the second ink portions form a three dimensional cladding structure that at least partially surrounds the core structure.

In some embodiments, a method of using a mirrorless optical waveguide can comprise providing an optical waveguide comprising a core structure and a cladding structure at least partially surrounding the core structure, the core structure comprising a first end portion, a second end portion, and an elongate section therebetween, the elongate section being substantially parallel to a surface plane, the first end portion and second end portion curving and extending from the elongate section to the surface plane, and the core structure having a higher refractive index than the cladding structure; and directing light through the core structure by emitting the light onto the first end portion such that the light propagates from the first end portion toward the elongate section and exits from the second end portion.

In some embodiments, an optoelectronic device can comprise a mirrorless optical waveguide comprising a core structure and a cladding structure at least partially surrounding the core structure, the core structure comprising a first end portion, a second end portion, and an elongate section therebetween, the elongate section being substantially parallel to a surface plane, the first end portion and second end portion curving and extending from the elongate section to the surface plane, and the core structure having a higher refractive index than the cladding structure; a light source to illuminate light onto the first end portion such that the light propagates from the first end portion toward the elongate section and exits from the second end portion; and a receiver component to receive the light that exits from the second end portion.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

In optoelectronic circuitry, an optical waveguide may be used to guide light from a light source (for example, a Vertical Cavity Surface Emitting Laser) into an optical receiver component (for example, a photodiode). Light that is incident on one end of the optical waveguide may propagate through the optical waveguide and into an optical receiver (for example, a photodiode). Conventional waveguides may include mirrors to direct the path of light into and out of the optical waveguide. In contrast, the embodiments disclosed herein omit such mirrors from a waveguide. Omitting mirrors can help prevent optic loss caused by reflection at the mirror. Further, omitting mirrors can reduce manufacturing costs and time.

Ink-jet printing can be used to make a mirrorless optical waveguide according to the embodiments disclosed herein. In some embodiments, the mirrorless optical waveguide can be a three dimensional structure with a core structure, and a cladding structure that surrounds the core structure at least partially. The cladding structure can be made from an ink that includes nanoparticles of urethane, acrylic or both. The ink that is used to form the core structure can have similar nanoparticles of urethane, acrylic or both, as well as additional nanoparticles that have a high refractive index, such as zirconia. In some embodiments, the core structure has an elongate section and two curved end sections that extend from the elongate section and curve toward a surface plane.

Figure 1:
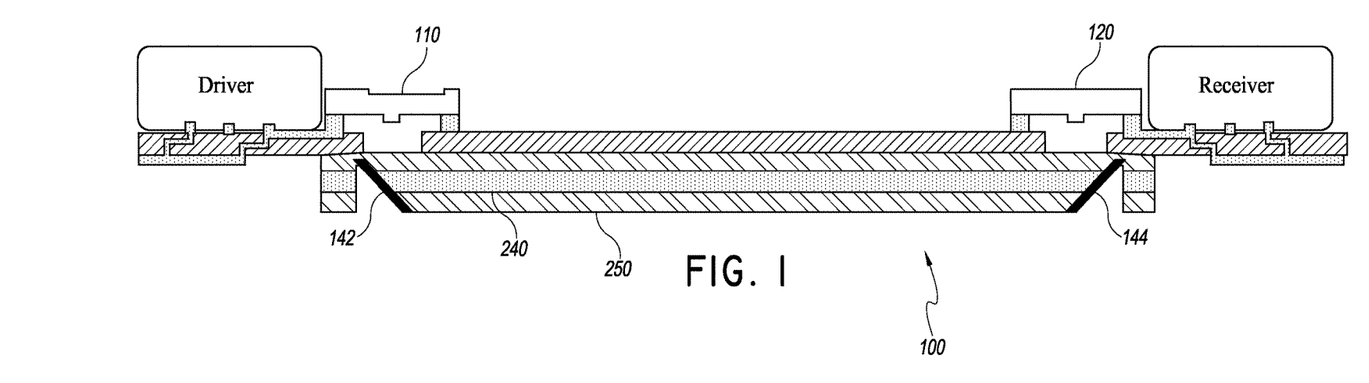
FIG. 1 illustrates a side cross-sectional view of a conventional waveguide with mirrors.

FIG. 1 illustrates a side cross-sectional view of a conventional waveguide 100 used in an optoelectronic circuit with a light source 110, an optical receiver 120 and a substrate 210. As illustrated in FIG. 1, the waveguide 100 can include a core structure 240 and a cladding structure 250 that at least partially surrounds the core structure. The waveguide 100 can further be disposed beneath the light source 110 and the optical receiver 120. FIG. 1 also illustrates mirrors 142, 144 disposed at opposite ends of the waveguide 100 underneath the light source 110 and the optical receiver 120. The mirrors 142, 144 may be positioned at angles that are oblique to the axis of the core 240. The mirror 142 underneath the light source 110 may be positioned at an angle such that such that light incident on that mirror 142, emitted from the light source 110, may be directed into the core 240 and toward the opposite end of the waveguide 200. The mirror 144 underneath the optical receiver 120 may be positioned at an angle such that light incident on that mirror 144 can be directed out of the core 240 and to the optical receiver 120.

Figure 2:
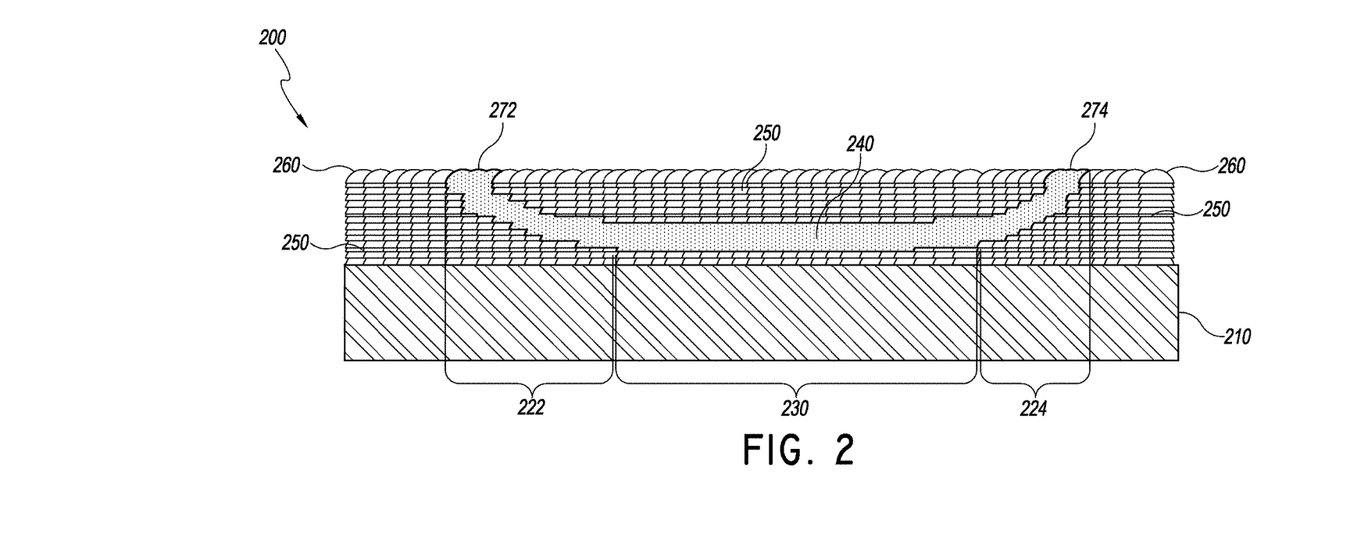
FIG. 2 illustrates a side cross-sectional view of a mirrorless optical waveguide in accordance with one embodiment.
Figure 3:
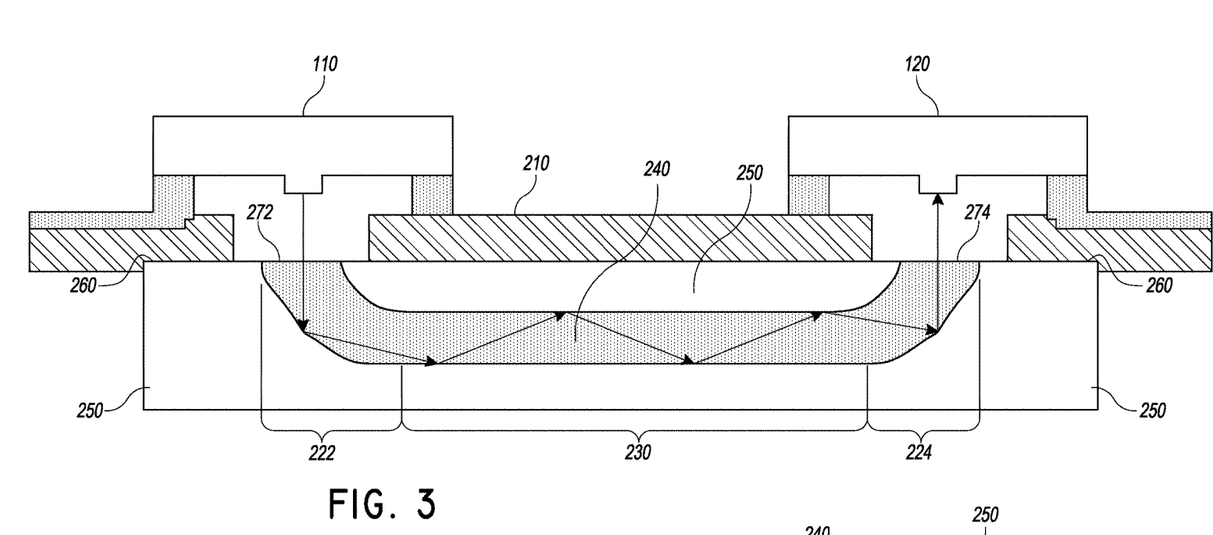
FIG. 3 illustrates light entering into one end of a mirrorless optical waveguide and exiting out of the other end of the waveguide.

FIG. 2 illustrates a side cross-sectional view of one embodiment of a mirrorless optical waveguide 200 formed on a substrate 210. In some embodiments, the substrate 210 is a silicon substrate. The optical waveguide 200 may include a core structure 240 and a cladding structure 250 surrounding the core structure. FIG. 3 shows an illustration of light entering into one end of the waveguide 200 and propagating through the waveguide 200 in an exemplary optoelectronic device. The shape and structure of the waveguide 200 formed according to the methods disclosed herein, as well as the difference in the indices of refraction of the cladding structure 250 and the core structure 240, allow light to enter into the waveguide 200 and propagate through the waveguide 200 without the use of mirrors such as the mirrors 142, 144 depicted in the conventional waveguide of FIG. 1.

Referring to FIG. 2, some embodiments of a mirrorless optical waveguide 200 include a core structure 240 that has an elongate section 230 and two curved end portions 222, 224 at opposite ends of the elongate section 230. The elongate section 230 can be substantially parallel to the substrate 210. Each of the curved end portions 222, 224 can extend from the elongate section 230 and curve toward a surface plane 260 that is parallel to the substrate 210. Thus, the core structure 240 can define a general "U" shape according to some embodiments. Each of the curved end portions can terminate in an opening 272, 274 in the surface plane. In some embodiments, one of the openings 272 can be an entrance which receives light emitted from a light source 110. In addition, the other of the openings 272 can be an exit through which light exits and into an optical detector 120. In some embodiments, the cladding structure 250 completely surrounds the core structure 240 except around the openings 272, 274.

Referring to FIG. 2, in some embodiments the curved end portions 222, 224 can define a radius of curvature, which may increase from the elongate section 230 toward the surface plane 260. Thus, the curved end portions 222, 224 may curve upwards toward the surface plane 260. In addition, the steep of the curve may increase closer toward the surface plane 250. In some embodiments, the radius of curvature may be greater than or equal to about 4 mm. In some embodiments, the radius of curvature may be greater than or equal to about 5 mm. Other radii of curvatures are also possible. The radii of curvature of the two end portions 222, 224 may be the same, according to some embodiments. The radii of curvature of the two end portions 222, 224 may also be different, according to some embodiments. In addition, in some embodiments, the radius of curvature of one curved end portion 222 can be independent of the radius of curvature of the other curved end portion 224. Thus, the curved end portions 222, 224 can independently define a radius of curvature.

In some embodiments, as illustrated in FIG. 2, the curved end portions 222, 224 can curve away from the substrate 210 but toward a surface plane 260 that is parallel to the substrate 210. In other embodiments, as illustrated in FIG. 3, the curved end portions 222, 224 can curve toward the substrate 210 and toward a surface plane 260 that is parallel to the substrate 210. In those embodiments, the portions of the substrate 210 covering the openings 272, 274 of the curved end portions 222, 224 can be removed to allow light, for example from photodiode 110, to enter the waveguide 200 and also to allow light to exit the waveguide 200 to, for example, an optical detector 120, as shown in FIG. 3.

Figure 4:
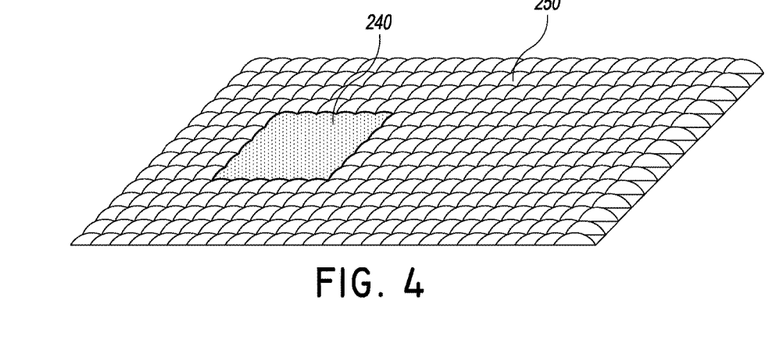
FIG. 4 illustrates a partial top perspective view of the mirrorless waveguide illustrated in FIG. 2.

The cross sectional shape of the core structure 240 can be a square, as illustrated in FIG. 4 which depicts a partial top perspective view of the waveguide 200 illustrated in FIG. 2. The cross sectional area of the core structure 240 can be of any geometric shape and need not be restricted to a square. In some embodiments, the cross sectional shape of the core structure 240 is a rectangle. In other embodiments, the cross sectional shape of the core structure 240 is an oval. Other cross sectional shapes are also possible. The dimensions of the core structure are not particularly limiting, and generally can be any dimension. The cross section of the core structure 240 can have a length and width ranging from about 30 μm×30 μm to about 200 μm×200 μm. For example, the cross section of the core structure 240 can have a length and width of about 30 μm×30 μm, 50 μm×50 μm, 70 μm×70 μm, 90 μm×90 μm, 110 μm×110 μm, 130 μm×130 μm, 150 μm×150 μm, 170 μm×170 μm, 190 μm×190 μm, 200 μm×200 μm, or a length and width between any of these values. The cross sectional area of the core structure 240 can be about 900 pm$^2$ to about 40 nm$^2$. For example, the cross sectional area of the core structure 240 can be about 900 pm$^2$, 1000 pm$^2$, 2500 pm$^2$, 4900 pm$^2$, 8100 pm$^2$, 12.1 μm$^2$, 16.9 μm$^2$, 22.5 μm$^2$, 28.9 μm$^2$, 36.1 μm$^2$, 40 μm$^2$, or an area in between any of these values. In some embodiments, the cross sectional area of the core structure 240 can be about 2500 pm$^2$.

The material of the cladding structure 250 can include nanoparticles of acrylic, urethane, or a combination of both. In some embodiments, the cladding nanoparticles have an inner layer of acrylic and an outer layer of urethane. The material of the core structure 240 can include similar nanoparticles of acrylic, urethane or both, as well as core nanoparticles that increase the refractive index of the core structure 240. These core nanoparticles can be made from materials having a high refractive index, such as tin oxide, alumina, zirconia, titania, or any combination thereof. For example, the core nanoparticles can be made from zirconia. In some embodiments, the core nanoparticles can be present in the core structure 240 in an amount of about 40% to 80%. For example, the core nanoparticles can be present in the core structure 240 in an amount of about 40%, 50%, 60%, 70%, 80%, or an amount in between any of these values. For example, the core nanoparticles can be present in the core in an amount of about 50%. In some embodiments, the core nanoparticles have an average diameter equal to or less than about 20 nm. For example, the average diameter of the core nanoparticles can be about 20 nm, about 16 nm, about 12 nm, about 8 nm, about 4 nm, about 2 nm, or an average diameter between any of these values.

In some embodiments, the refractive index of the core 240 can be higher than the refractive index of the cladding structure 250. The difference in the indices of refraction can allow light to travel through the core structure 240 in a path following the shape of the core 240 structure. In addition, as the core structure 240 may include two curved end portions 222, 224 that curve toward a surface plane 260, light can travel into the waveguide 200 and out of the waveguide 200, without the use of mirrors. The refractive index of the cladding structure 250 can be about 1.490 to about 1.520. For example, the refractive index of the cladding structure 250 can be about 1.490, 1.500, 1.510, 1.520, or a refractive index between any of these values. The refractive index of the core structure 240 can be about 1.502 to about 1.551. For example, the refractive index of the core structure 240 can be about 1.502, 1.510, 1.520, 1.530, 1.540, 1.551, or a refractive index between any of these values. In some embodiments, the cladding structure 250 can have a refractive index of about 1.490 and the core structure 240 can have a refractive index of about 1.551. In some embodiments, the relative refractive index difference is greater than 0.75%. The relative refractive index difference is represented by formula (1) below:

$$\frac{n_1^2 - n_2^2}{2n_1^2} \geq 0.75\% \quad (1)$$

where $n_1$ represents the refractive index of the core structure 240 and $n_2$ represents the refractive index of the cladding structure 250. Thus, for example, in some embodiments the core structure 240 can have a refractive index of 1.502 and the cladding structure 250 can have a refractive index of 1.49. As another example, in some embodiments the core 240 can have a refractive index of 1.532 and the cladding structure 250 can have a refractive index of 1.52. In some embodiments, increasing the refractive index of the core structure 240 can allow the curved end portions 222, 224 to have smaller radii of curvature, due the relatively large critical angle Referring to FIGS. 5-8, there is illustrated a method of making a mirrorless optical waveguide 200. FIGS. 5A-5D and 7-8 illustrate partially formed mirrorless optical waveguides along different steps during the manufacturing process. Using any suitable method, such as ink-jet printing, a plurality of layers 510 can be sequentially deposited onto a substrate 210. Each layer can include a core structure portion deposited using a core ink and a cladding structure portion deposited using a cladding ink. For example, FIG. 6 illustrates one example of a layer with a core structure portion 910 and a cladding structure portion 920. In some embodiments, some layers have only a cladding structure portion 920 and no core structure portion 910. The core structure portion 910 and the cladding structure portion 920 in each layer can be deposited simultaneously in some embodiments. In other embodiments, the core structure portion 910 and the cladding structure portion 920 can be deposited sequentially in each layer. For example, after the core structure portion 910 is deposited in one layer, then the cladding structure portion 920 can be deposited in that same layer.

In some embodiments, a method of making a mirrorless optical waveguide 200 includes ink-jet printing. In these embodiments, ink-jet printing can include depositing droplets onto a substrate 210. The droplets may have a volume of about 1 pl to about 10 pl according to some embodiments. For example, the droplets may have a volume of about 1 pl, 2 pl, 4 pl, 6, pl, 8 pl, 10 pl, or a volume in between any of these values. Once the droplets are printed onto a substrate 210, the droplets may form a circle with a diameter of about 12 µm to about 40 µm. For example, the droplets may form a circle with a diameter of about 12 µm, 15 µm, 20 µm, 25 µm, 30 µm, 35 µm, 40 µm, or a diameter in between any of these values.

In some embodiments, each layer may be dried before a subsequent layer is deposited thereon. The thickness of each layer can be about 0.1 µm to about 1.6 µm. For example, the thickness of each layer can be about 0.1 µm, 0.2 µm, 0.4 µm, 0.6 µm, 0.8 µm, 1.0 µm, 1.2 µm, 1.4 µm, 1.6 µm, or a thickness in between any of these values. The thickness of each layer can be 0.83 µm according to some embodiments. In some embodiments, about 50 to about 6000 layers can be printed onto the substrate 210, thus resulting in optical waveguide 200 with a height of about 90 µm to about 600 µm. For example, one-hundred and eighty (180) layers can be printed onto the substrate 210, thus resulting in an optical waveguide 200 with a height of about 150 µm. The number of layers and the height of the optical waveguide 200 can vary.

Figure 5A:
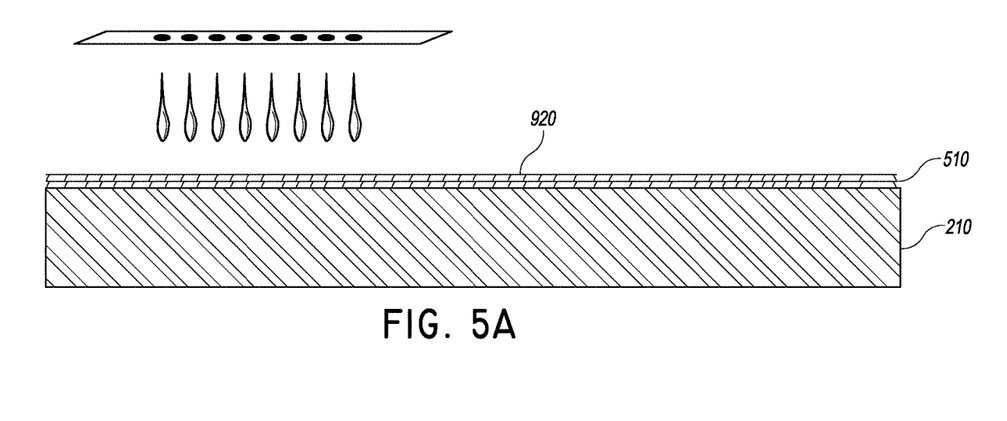
FIGS. 5A-5D illustrate progressive stages in a 3 dimensional printing process for manufacturing a mirrorless optical waveguide.
Figure 5B:
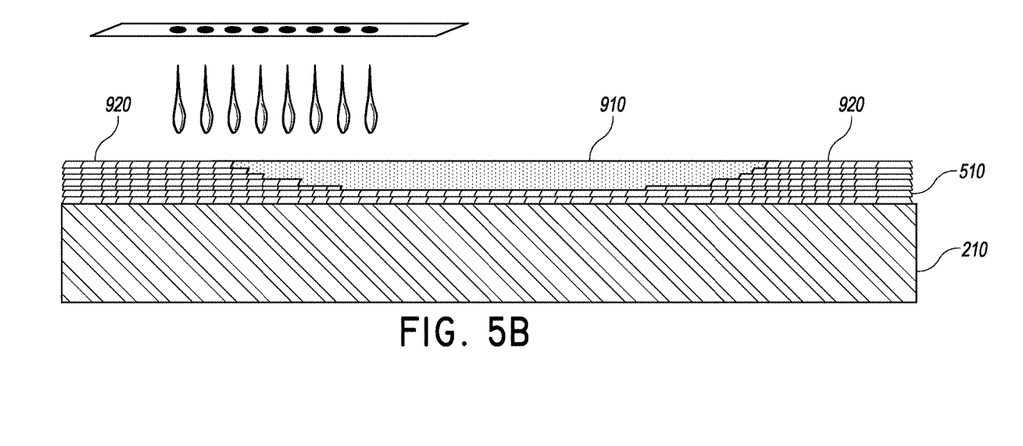
Figure 5C:
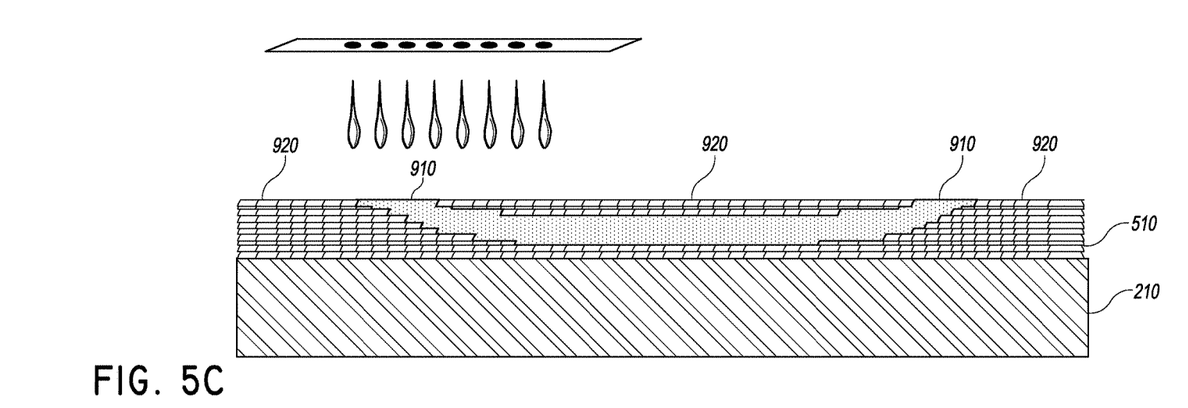
Figure 5D:
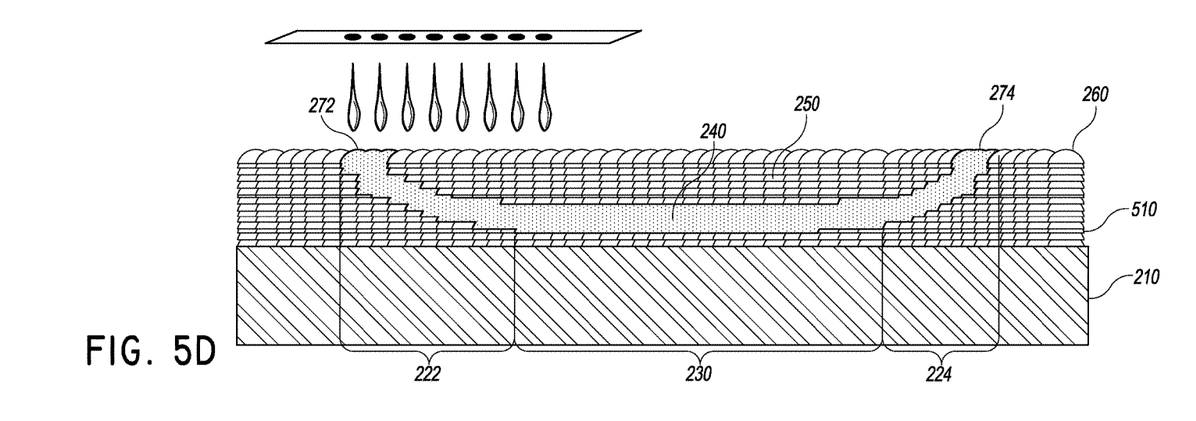
Figure 6:
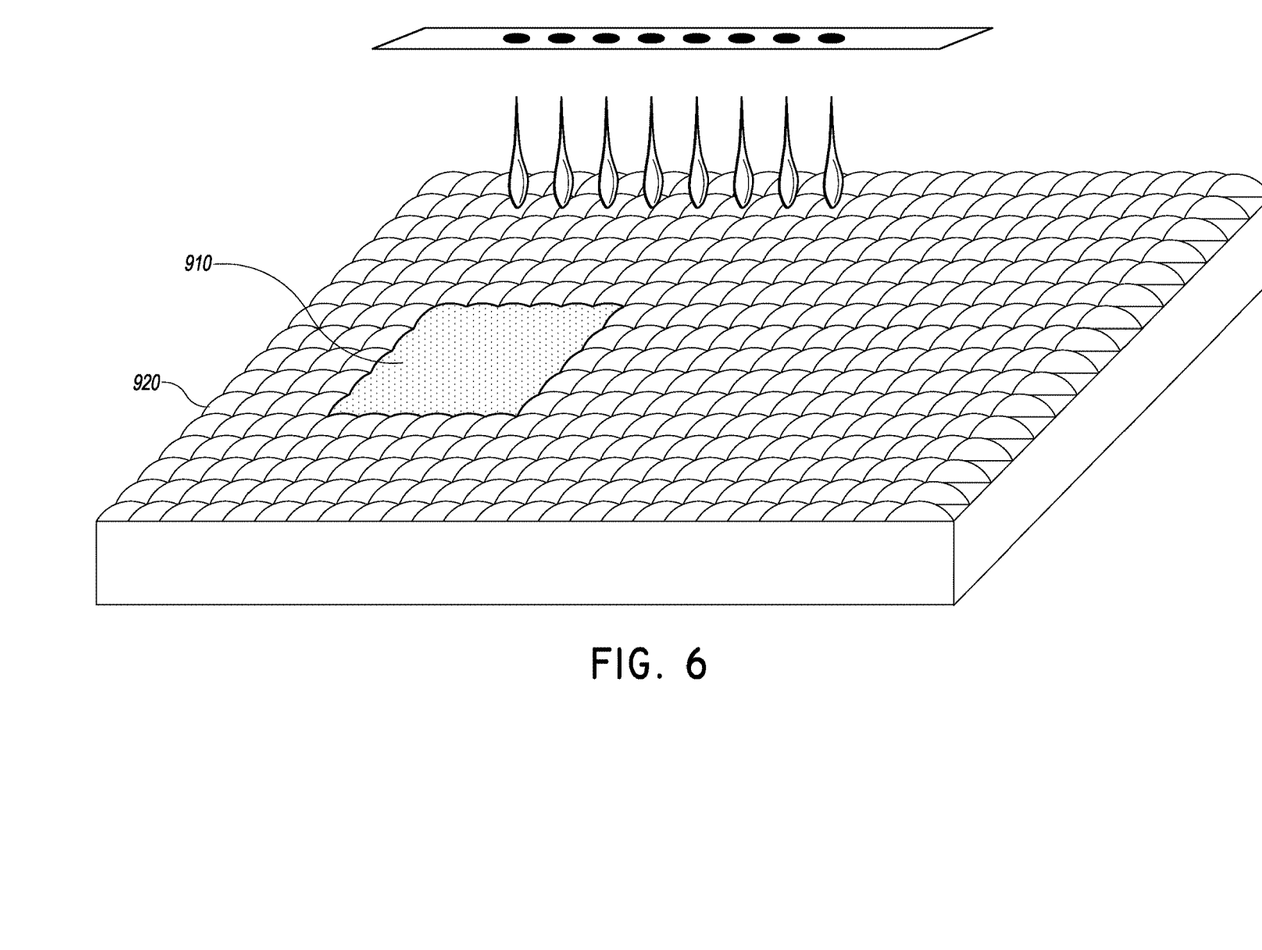
FIG. 6 is a perspective view of a portion of one layer of a mirrorless optical waveguide being deposited, the layer having a cladding structure portion surrounding a core structure portion.

Referring to FIGS. 5A-D, layers can be sequentially deposited onto a substrate 210 such that the core structure portion 910 in one layer is offset from the core structure portion 910 in an adjacent layer. For example, two adjacent layers can have core structure portions 910 that partially overlap. The layout and dimensions of the core structure portion 910 and the cladding structure portion 920 in each layer can be designed so that when a plurality of layers are deposited, the core structure portions 910 form a three-dimensional core structure 240. Referring to FIG. 5D, in some embodiments the three-dimensional core structure 240 has two curved end portions 222, 224 and an elongate section 230 therebetween. In addition, in some embodiments, the two curved end portions 222, 224 define a radius of curvature and curve toward a surface plane 260 where the curved end portions 222, 224 each terminate in an opening 272, 274. Similarly, the layout of the core structure portion 910 and the cladding structure portion 920 in each layer can be designed so that when a plurality of layers are deposited, the cladding structure portions 910 form a three dimensional cladding structure 250 that surrounds the core structure 240. In some embodiments, the cladding structure 250 does not surround the openings 272, 274 of the curved end portions 222, 224.

Referring to FIG. 5A, in some embodiments, a method of making a mirrorless optical waveguide 200 can begin by depositing cladding layers 510 onto a substrate 210. The cladding layers may have only a cladding structure portion 920 and no core structure portion 910. Next, referring to FIG. 5B, a plurality of layers having one core structure portion 910 can be deposited onto the previously deposited layers. The layers having one core structure portion 910 can form the elongate section 230 of the three-dimensional core structure 240. Next, referring to FIG. 5C, a plurality of layers having two core structure portions 910 can be deposited onto the previously deposited layers. The layers having two core structure portions 910 can eventually form the two curved end portions 222, 224 of the three-dimensional core 240. In some embodiments, the two curved end portions 222, 224 terminate at a surface that is opposite the cladding layers 510. The layout and dimensions of the core structure portion 910 and the cladding structure portion 920 in each layer can be designed so that when a plurality of layers are deposited, the layers form the three dimensional core structure 240 and cladding structure 250 illustrated in FIG. 5D.

Figure 7:
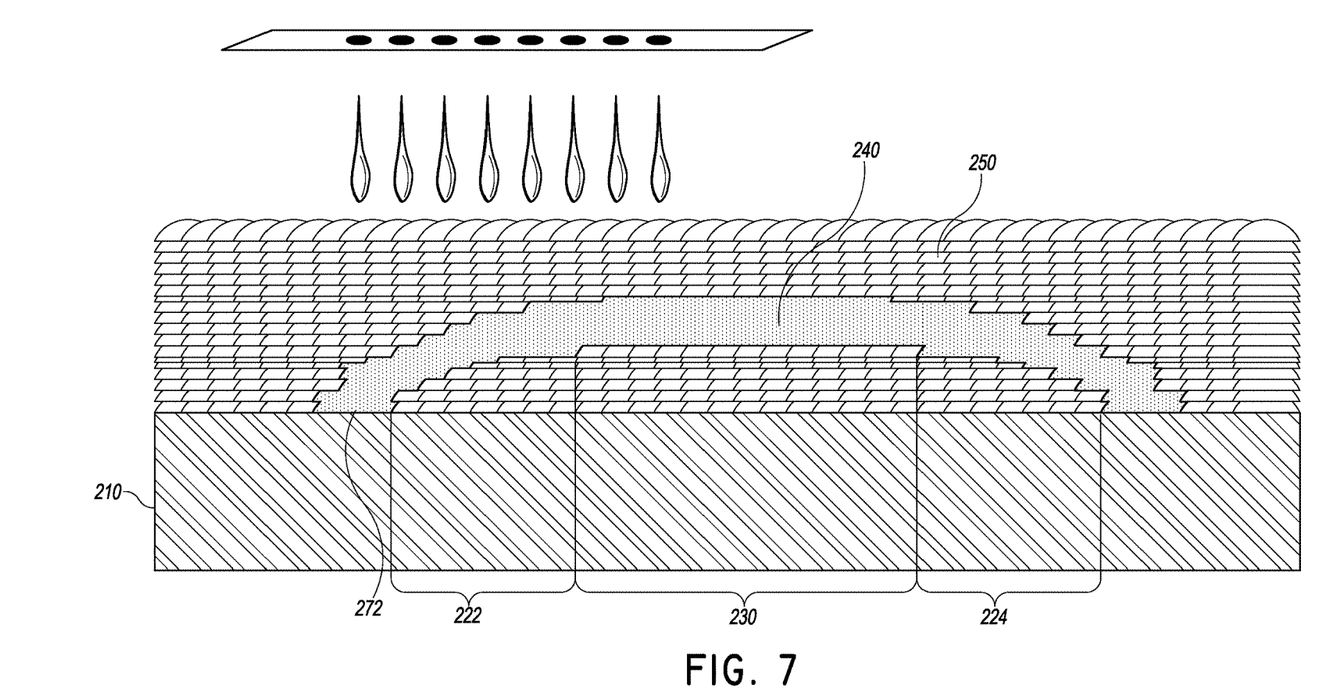
FIG. 7 illustrates a partially formed mirrorless optical waveguide during one step of a manufacturing process in accordance with one embodiment.
Figure 8:
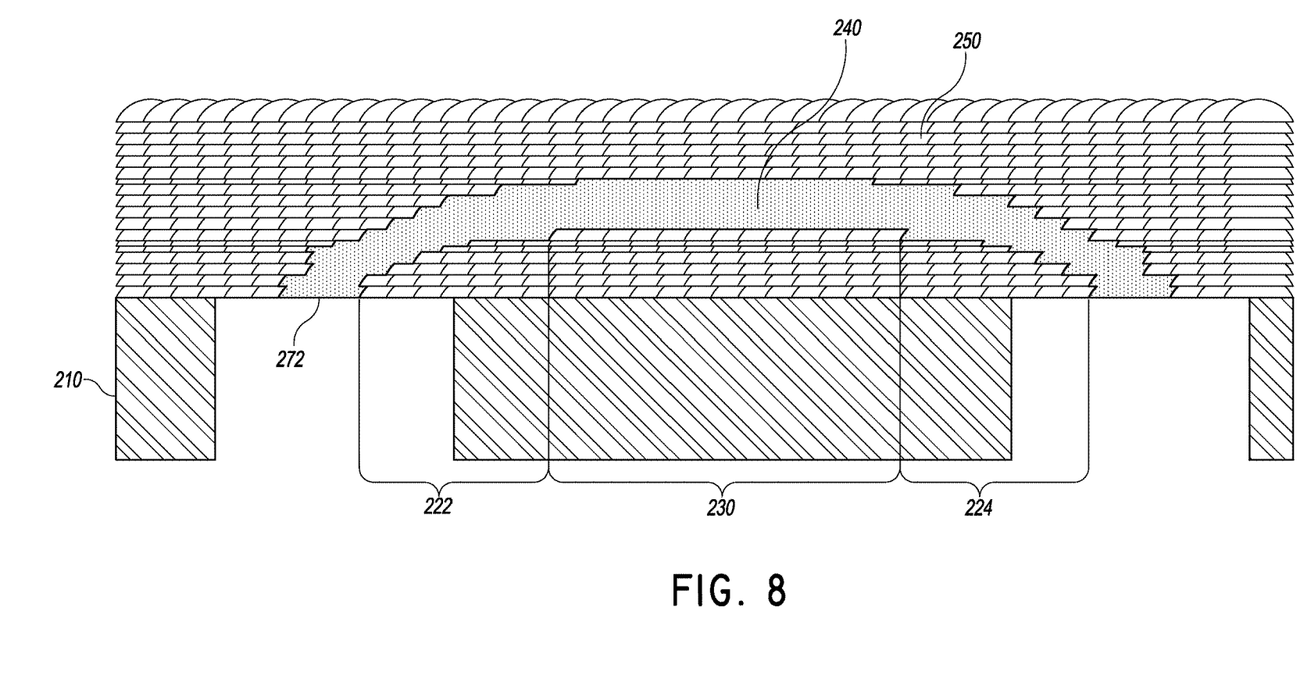
FIG. 8 illustrates a completed mirrorless optical waveguide, wherein sections of the substrate are removed to expose end portions of the core structure.

FIGS. 5A-D illustrate a method of making a mirrorless optical waveguide which has curved end portions 222, 224 that curve away from the substrate 210. To make a mirrorless waveguide with curved end portions that curve toward the substrate 210, an example of which is depicted in FIG. 7, a method similar to that of FIGS. 5A-D can be employed. For example, the order of the layers deposited in FIG. 7 can be reversed compared to the order of the layers deposited in FIG. 5D. For example, the cladding layers 510 can be deposited last instead of first. Referring to FIG. 8, after all the layers are deposited onto the substrate 210, the portions of the substrate 210 adjacent the openings 272, 274 of the two curved end portions 222, 224 can be removed, to allow access into and out of the core 240.

Figure 9:
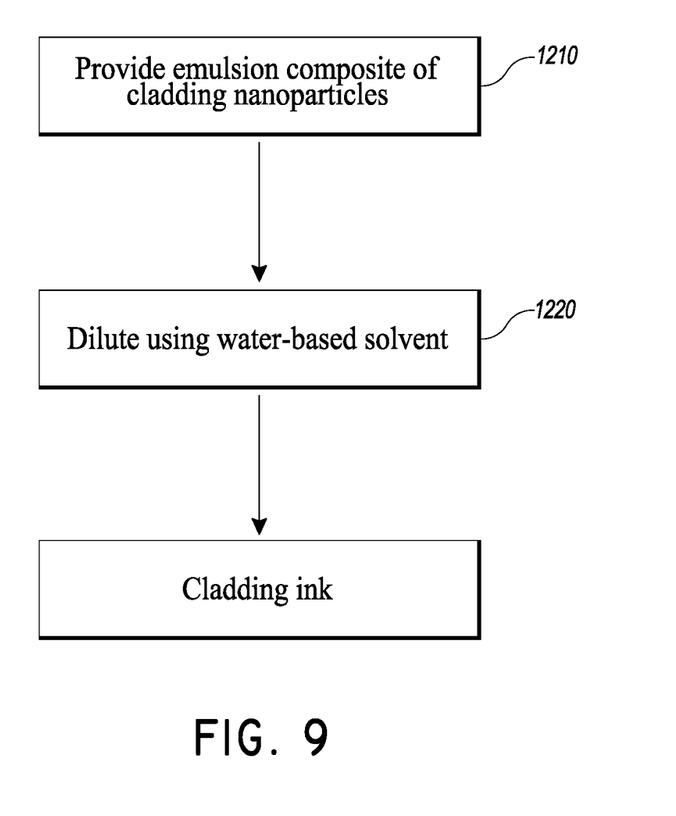
FIG. 9 illustrates a method of preparing a cladding ink in accordance with one embodiment.

FIG. 9 illustrates a method of preparing a cladding ink that can be used to form the cladding structure 250 of a mirrorless optical waveguide 200. At step 1210, an emulsion composite of cladding nanoparticles can be provided. The material of the nanoparticles can be acrylic, urethane, or both. In some embodiments, the nanoparticles can have an inner layer of acrylic and an outer layer of urethane. Thus, the emulsion composite can have the advantages of both acrylic (for example, ease of film formation, luster, weatherability, hardness, pigment dispersability) and urethane (for example, robustness, adhesion, and frictional resistance).

Next at step 1220, a water-based solvent can be used to dilute the emulsion composite. The water weight ratio of the water-based solvent can range from about 20:80 to about 80:20. For example, the water weight ratio of the water-based solvent can be about 20:80, 30:70, 40:60, 50:50, 60:40, 70:30, 80:20, or a ratio in between any of these values. In some embodiments, the water weight ratio is 80:20. After the emulsion composite is diluted with the water-based solvent, the concentration of cladding nanoparticles can range from about 1% to about 20%. For example, the concentration of cladding nanoparticles can be about 1%, 2%, 4%, 6%, 8%, 10%, 12%, 14%, 16%, 18%, 20%, or a concentration in between any of these values. For example, the concentration of cladding nanoparticles in the diluted emulsion can be about 10% by weight. The composition containing a diluted emulsion composite of nanoparticles can serve as the ink for the cladding structure 250.

In some embodiments, the water-based solvent used to dilute the emulsion composite of nanoparticles has a high boiling temperature. The high boiling temperature can prevent the ink from drying too rapidly. Ink drying too rapidly may hinder ink-jet printing due to excessive surface tension or nozzle blockage. The water-based solvent can have a boiling temperature ranging from about 100° C. to about 320° C. For example, the water-based solvent can have a boiling temperature of about 100° C., 120° C., 140° C., 160° C., 180° C., 200° C., 220° C., 240° C., 260° C., 280° C., 300° C., 320° C., or a boiling temperature in between any of these values. In some embodiments, the water-based solvent contains water and one or more of the following: methyl isobutyl ketone, diacetone alcohol, cyclohexanone, 3,5,5-trimethyl-2-cyclohexene-1-one, propyleneglycol monomethyl ether, ethylene glycol monoethyl ether, ethylene glycol monobutyl ether, diethylene glycol monoethyl ether, diethylene glycol monobutyl ether, propyleneglycol monomethylether acetate, ethylene glycol monoethyl ether acetate, ethylene glycol monobutyl acetate, diethyleneglycol monoethyl ether acetate, 1,3-butanediol, 1,4-butanediol, 1,5-pentanediol, 2-methyl-1,3-propanediol, tetraethylene glycol, and tetraethylene glycol dimethyl ether.

In choosing a water-based solvent, parameters such as volatility, miscibility with water, transparency, and the allowable environmental concentration that remains safe for users, may be taken into consideration. In some embodiments, the water-based solvent contains water and tetraethylene glycol.

Figure 10:
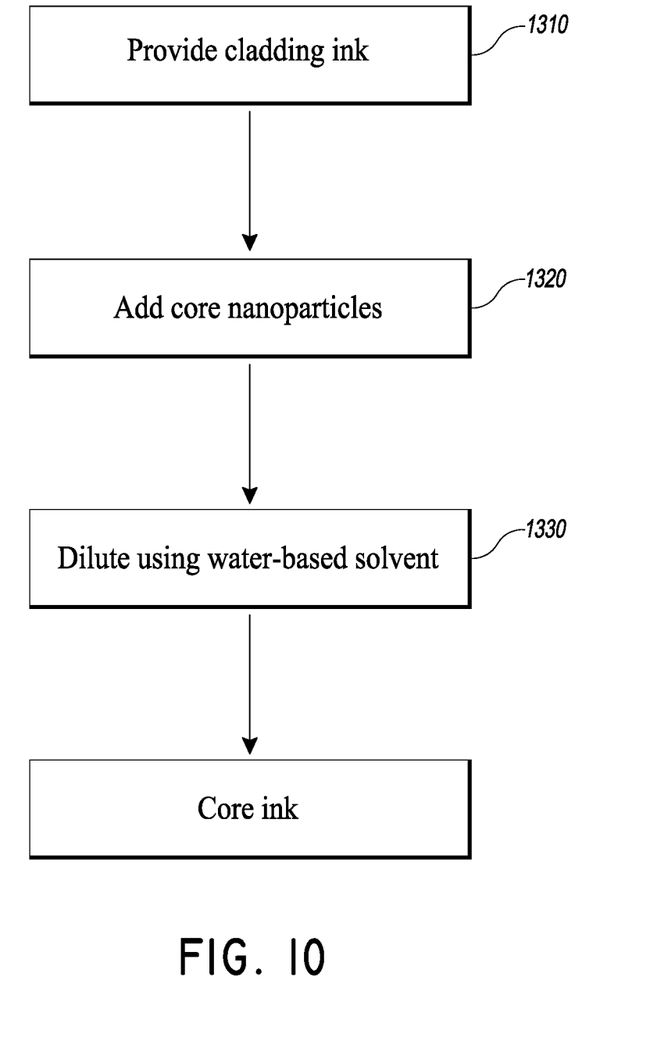
FIG. 10 illustrates a method of preparing a core ink in accordance with one embodiment.

FIG. 10 illustrates a method of preparing a core ink that can be used to form the core structure 240 of a mirrorless optical waveguide 200. At step 1310, a cladding ink, prepared in the same manner as in FIG. 9, can be provided. Next, at step 1320, a suspension of core nanoparticles can be added to the cladding ink, thus yielding a composition having core nanoparticles and cladding nanoparticles in an emulsion composite. In some embodiments, core nanoparticles can be added in an amount such that the ratio of core nanoparticles to cladding nanoparticles ranges from about 40:60 to about 90:10. For example, the ratio of core nanoparticles to cladding nanoparticles can be about 40:60, 50:50, 60:40, 70:30, 80:20, 90:10 or a ratio in between any of these values. In some embodiments, the ratio of core nanoparticles to cladding nanoparticles is about 50:50. In some embodiments, the core nanoparticles can be tin oxide, alumina, zirconia, titania, or a combination thereof.

The core nanoparticles can be used to increase the refractive index of the composition. Thus, in some embodiments the core nanoparticles can be made of a material having a high refractive index. For example, the core nanoparticles can be made of tin oxide, alumina, zirconia, and/or titania. In some embodiments, the core nanoparticles can be made of zirconia with a refractive index of about 1.95. The core nanoparticles may have an average diameter of equal to or less than about 20 nm. For example, the average diameter of the core nanoparticles can be about 20 nm, about 16 nm, about 12 nm, about 8 nm, about 4 nm, about 2 nm, or an average diameter between any of these values. Controlling the amount of core nanoparticles added to the cladding ink can control the refractive index of the composition. In general, increasing the amount of core nanoparticles in the composition may increase the refractive index of the composition.

After the core nanoparticles are added to the cladding ink, the composition can be diluted using a water-based solvent at step 1330, thus yielding a core ink. The water-based solvent can be the same as that used to prepare the cladding ink. In some embodiments, after the diluting step is completed, the concentration of nanoparticles (both cladding nanoparticles and core nanoparticles together) can be about 1% to about 20% by weight. For example, the concentration of the nanoparticles can be about 1%, 2%, 4%, 6%, 8%, 10%, 12%, 14%, 16%, 18%, 20% by weight, or a concentration between any of these values. For example, the concentration of nanoparticles in the cladding ink can be about 10% by weight. After the core ink and the cladding ink are dried, the amount of core nanoparticles present in the core structure 240 can be the same as the ratio of core nanoparticles to cladding nanoparticles. For example, if the ratio of core nanoparticles to cladding nanoparticles is 40:60, the amount of core nanoparticles present in the core structure 240 would be 40%.

Figure 11:
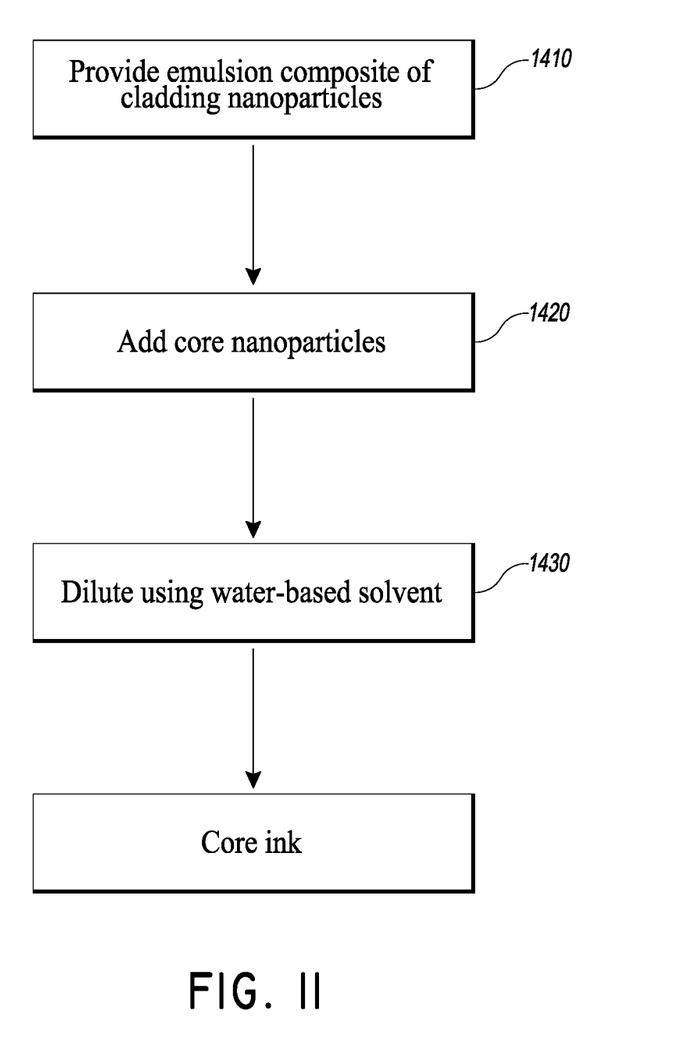
FIG. 11 illustrates a method of preparing a core ink in accordance with an alternative embodiment.

FIG. 11 illustrates another method of preparing a core ink. At step 1410, an emulsion composite of cladding nanoparticles can be provided. The material of the cladding nanoparticles can be acrylic, urethane or both. Next at step 1420, a suspension of core nanoparticles can be added to the emulsion composite. Next, at step 1430, the mixture of cladding nanoparticles and core nanoparticles can be diluted using a water-based solvent, such that the concentration of nanoparticles (both cladding nanoparticles and core nanoparticles together) is about 1% to about 20%. For example, the concentration of nanoparticles can be about 1%, about 2%, about 4%, about 6%, about 8%, about 10%, about 12%, about 14%, about 16%, about 18%, about 20% by weight, or a concentration in between any of these values. For example, the solid content can be about 10% by weight. The water-based solvent can be the same as that described above with respect to FIG. 12.

Thus, compared to the method illustrated in FIG. 10, FIG. 11 illustrates a method wherein a suspension of core nanoparticles is added to the emulsion composite of cladding nanoparticles instead of the cladding ink. Therefore, the core nanoparticles can be added to the emulsion composite of cladding nanoparticles directly without diluting the emulsion composite of cladding nanoparticles first. In other embodiments, a water-based solvent is added to an emulsion composite of cladding nanoparticles, followed by adding the core nanoparticles, the water-based solvent or both.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Example 1 Preparing Ink for the Cladding Structure

An emulsion composite with nanoparticles was provided. (WEM-3008 from Taisei Fine Chemical Co., Ltd., Japan). The emulsion composite had nanoparticles with an average diameter of 100 nm. The nanoparticles had an inner layer of acrylic and an outer layer of urethane. The concentration of nanoparticles in the emulsion composite was 32%, by weight. Next, a water-based solvent, specifically tetraethylene glycol (boiling point 328° C., water weight ratio 80:20), was added to the nanoparticle emulsion composite, such that the concentration of nanoparticles in the emulsion composite became 10%, by weight. The resulting composition was used as the ink for the cladding structure. The ink composition was applied to a glass substrate, thereby forming a film. A film thickness measure device (F20 Filmetrics, Inc., San Diego, Calif.) was used to determine the refractive index of the film of ink. The refractive index of the ink was 1.490.

Example 2 Preparing Ink for the Core

Figure 12:
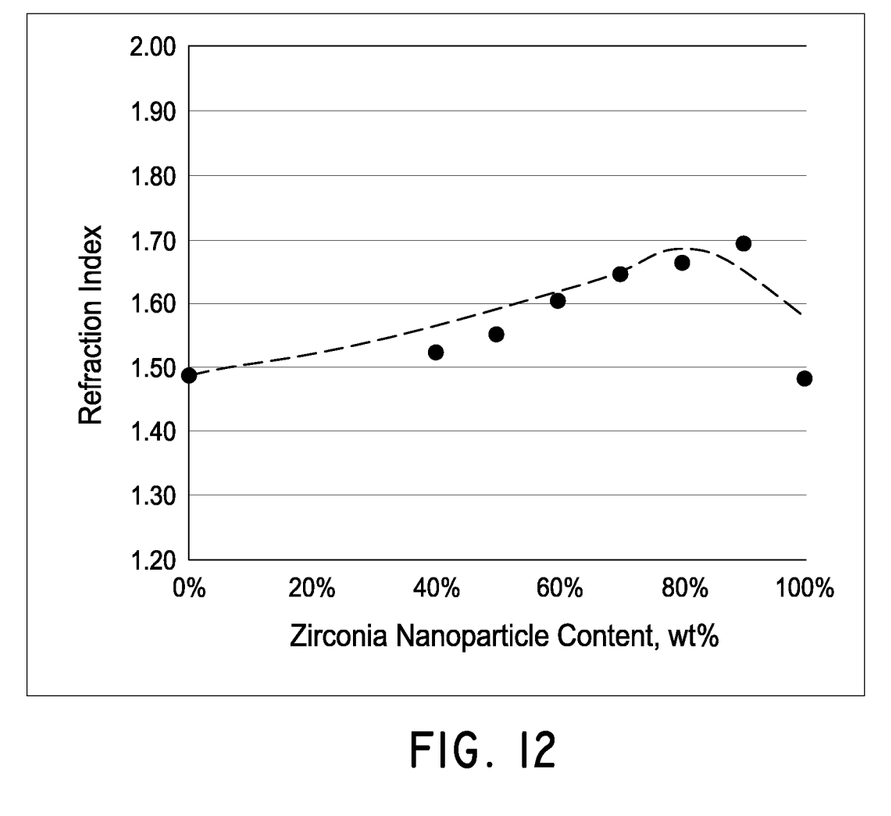
FIG. 12 is a graph depicting the relationship between the concentration of nanoparticles in the core structure and the refractive index of the core structure. The x-axis represents the nanoparticle concentration as a percentage by weight of the core structure. The y-axis represents the refraction index of the core structure.

A cladding ink composition was prepared in the same manner as in Example 1. Zirconia nanoparticles (NanoUse ZR-30BF, specific gravity of 1.37, pH of 7.1, refractive index of 1.95, and 30% concentration of nanoparticles by weight, Nissan Chemical Industries, Ltd., Japan) were added to the cladding ink composition to form the ink for the core structure. Several different mixtures were prepared, each with a different amount of zirconia nanoparticles. The ratios of amount of zirconia nanoparticles to the amount of total nanoparticles in the cladding ink were: 0:100; 40:60; 50:50; 60:40; 70:30; 80:20; 90:10; and 100:0. Each resulting ink composition having a different amount of zirconia nanoparticles was applied to a glass substrate, thereby forming a film. The refractive index of the film of ink was measured using a film thickness measurement device (F20 Filmetrics Inc., San Diego, Calif.). FIG. 12 shows the refractive indices for each of the ink compositions having a different amount of zirconia nanoparticles. Table 1 below shows the values of the refractive indices for each of the ink compositions having a different amount of zirconia nanoparticles. Therefore, the refractive index of the core structure can be tailored based on the amount of zirconia nanoparticles introduced to the starting ink composition.

TABLE 1

| Refraction Index | Zirconia Nanoparticle Content, by weight |
|---|---|
| 1.489 | 0% |
| 1.522 | 40% |
| 1.551 | 50% |
| 1.606 | 60% |
| 1.645 | 70% |
| 1.663 | 80% |
| 1.692 | 90% |
| 1.482 | 100% |

Example 3 Making a Mirrorless Optical Waveguide

A cladding ink was prepared in the same manner as in Example 1. A core ink was prepared in the same manner as in Example 2. Using the cladding ink, several layers of cladding were deposited using ink-jet printing onto a silicon substrate. Next, a layer having a cladding structure portion and a core structure portion was deposited onto the previously deposited layer using the cladding ink and the core ink, respectively. Thus, the cladding structure portion was printed from the cladding ink and the core structure portion was printed from the core ink. Next, another layer having a cladding structure portion and one core structure portion was deposited onto the previously deposited layer. The core structure portion in this layer and the core structure portion in the previous layer were offset from each other. A plurality of layers having a cladding structure portion and one core structure portion were sequentially deposited onto the previously deposited layers, with each core structure portion being offset from the core structure portion in an adjacent layer. Next, a plurality of layers, each having a cladding structure portion and two core structure portions, were sequentially deposited onto the previously deposited layers. Each of the two core structure portions in one layer was offset from each of the two core structure portions in an adjacent layer.

After all the layers were deposited, the core structure portions formed a three-dimensional core structure having an elongate section and two curved end portions that extended from the elongate section and curved away from the substrate toward a surface plane. Each of the curved end portions formed openings at the surface plane. In addition, the cladding structure portions formed a three dimensional cladding structure that completely surrounded the core except around the openings.

Example 4 Making and Using an Optoelectronic Circuit

A mirrorless optical waveguide is prepared in the same manner as in Example 3. A light source (Vertical Cavity Surface Emitting Laser) is positioned above the opening of one of the curved end portions of the waveguide core structure. A detector (photodiode) is positioned above the opening of the other curved end portion of the waveguide core structure. Light is emitted from the light source into the opening of one of the curved end portions. Light propagates through the waveguide core structure, exits the opening of the other curved end portion, and is received by the detector. Accordingly, it can be shown that the optical waveguide in accordance with the disclosed embodiments do not require mirrors for light propagation, and can therefore ameliorate or avoid optical loss resulting from the use of mirrors.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A mirrorless optical waveguide, comprising:
   a core structure comprising a first end portion, a second end portion, and an elongate section therebetween, wherein the elongate section is substantially parallel to a surface plane, and wherein the first end portion and second end portion are curved and extend upwards from the elongate section to the surface plane to define a U shape; and
   a cladding structure at least partially surrounding the core structure,
   wherein a refractive index of the core structure is higher than a refractive index of the cladding structure,
   wherein the cladding structure comprises acrylic resin and urethane resin, wherein the core structure includes core nanoparticles and the cladding structure includes cladding nanoparticles, and wherein a ratio of the core nanoparticles to the cladding nanoparticles is from about 40:60 to about 90:10.

2. The mirrorless optical waveguide of claim 1, wherein the radius of curvature increases from the elongate section toward the surface plane.

3. The mirrorless optical waveguide of claim 1, wherein the cladding nanoparticles comprise an emulsion composite of nanoparticles of acrylic and urethane.

4. The mirrorless optical waveguide of claim 1, wherein the core nanoparticles comprise tin oxide, alumina, zirconia, titania, or a combination thereof.

5. The mirrorless optical waveguide of claim 1, wherein the core nanoparticles have an average diameter equal to or less than about 20 nm.

6. The mirrorless optical waveguide of claim 1, wherein the first end portion and the second end portion each terminate in a respective opening in the surface plane and the cladding structure surrounds the core structure except around the respective opening for the first end portion and the respective opening for the second end portion.

7. An optoelectronic device, comprising:
a mirrorless optical waveguide comprising a core structure and a cladding structure at least partially surrounding the core structure, the core structure comprising a first end portion, a second end portion, and an elongate section therebetween, the elongate section being substantially parallel to a surface plane, the first end portion and second end portion curving upwards and extending from the elongate section to the surface plane to define a U shape, and the core structure having a higher refractive index than the cladding structure;
a light source to illuminate light onto the first end portion such that the light propagates from the first end portion toward the elongate section and exits from the second end portion; and a receiver component to receive the light that exits from the second end portion,
wherein the cladding structure comprises acrylic resin and urethane resin, wherein the core structure includes core nanoparticles and the cladding structure includes cladding nanoparticles, and wherein a ratio of the core nanoparticles to the cladding nanoparticles is from about 40:60 to about 90:10.

8. The optoelectronic device of claim 7, wherein the light source is a vertical cavity surface emitting laser (VCSEL).

9. The optoelectronic device of claim 7, wherein the receiver component is a photodiode.

10. The optoelectronic device of claim 7, wherein the cladding nanoparticles are in a concentration from about 1% to about 20% of weight of the cladding structure.

11. The optoelectronic device of claim 7, wherein the core nanoparticles are in concentration from about 40% to about 80% of weight of the core structure.

12. A mirrorless optical waveguide, comprising:
a core structure comprising a first end portion, a second end portion, and an elongate section therebetween, the elongate section is substantially parallel to a surface plane, and the first end portion and second end portion are curved upwards and extend from the elongate section to define a U shape, the core structure including core nanoparticles in a first concentration; and
a cladding structure at least partially surrounding the core structure, wherein the cladding structure comprises acrylic resin and urethane resin, wherein a refractive index of the core structure is higher than a refractive index of the cladding structure, the cladding structure including cladding nanoparticles in a second concentration, and wherein a ratio of the first concentration to the second concentration is from about 40:60 to about 90:10.

13. The mirrorless optical waveguide of claim 12, wherein the second concentration is from about 1% to about 20% of weight of the cladding structure.

14. The mirrorless optical waveguide of claim 12, wherein the first concentration is from about 40% to about 80% of weight of the core structure.

15. The mirrorless optical waveguide of claim 12, wherein the cladding nanoparticles are different from the core nanoparticles.

16. The mirrorless optical waveguide of claim 12, wherein the core nanoparticles include at least one of alumina, zirconia, or titania.

17. The mirrorless optical waveguide of claim 12, wherein the first end portion and second end portion extend from the elongate section.

* * * * *